Figure 1:
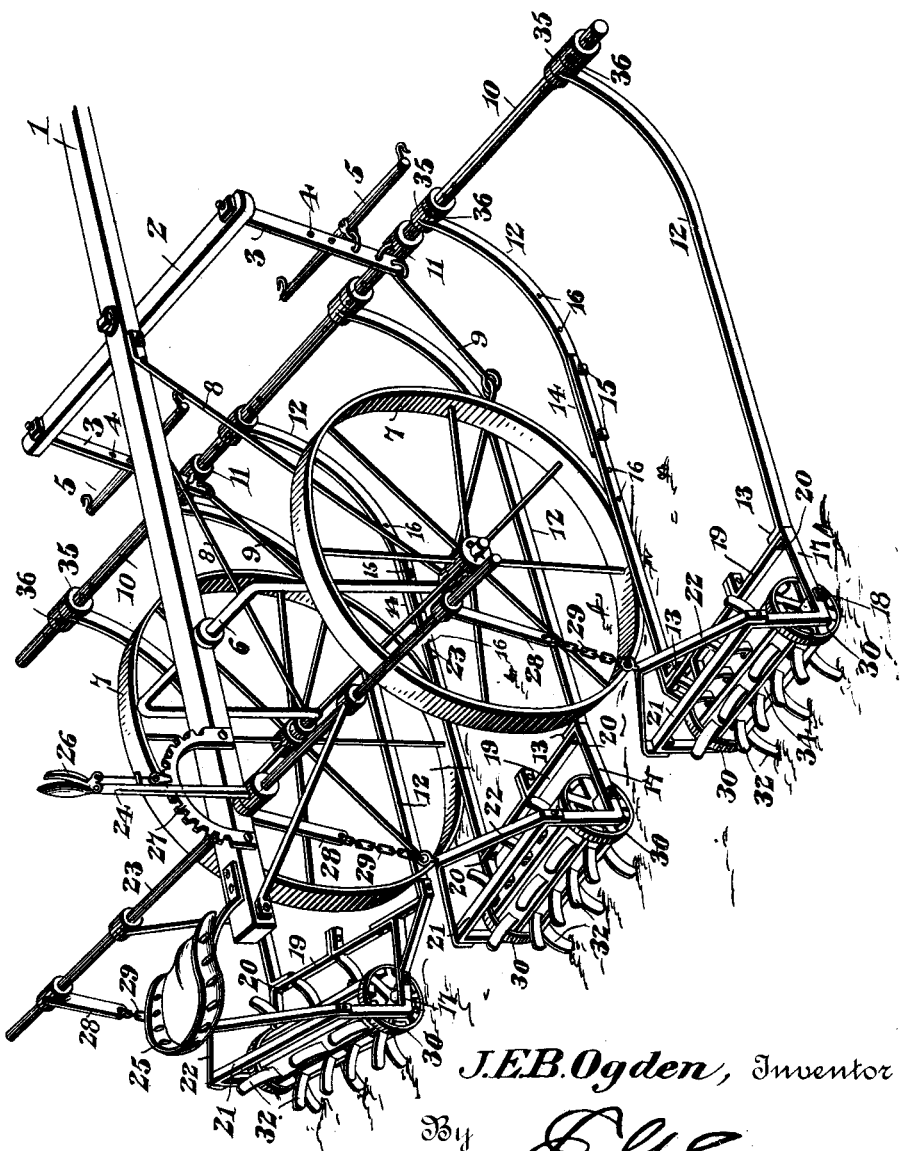

No. 675,968. Patented June 11, 1901.
J. E. B. OGDEN.
COMBINED COTTON CHOPPER AND CULTIVATOR.
(Application filed Dec. 27, 1900.)
(No Model.) 3 Sheets—Sheet 1.

J.E.B. Ogden, Inventor

Witnesses

Attorney

No. 675,968. Patented June 11, 1901.
J. E. B. OGDEN.
COMBINED COTTON CHOPPER AND CULTIVATOR.
(Application filed Dec. 27, 1900.)
(No Model.) 3 Sheets—Sheet 2.

J. E. B. Ogden, Inventor

Witnesses
Jas. K. McCachran
P. M. Smith

By C. G. Siggers
Attorney

No. 675,968. Patented June 11, 1901.
J. E. B. OGDEN.
COMBINED COTTON CHOPPER AND CULTIVATOR.
(Application filed Dec. 27, 1900.)
(No Model.) 3 Sheets—Sheet 3.
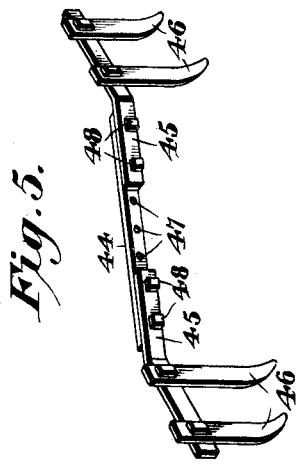
Fig. 5.
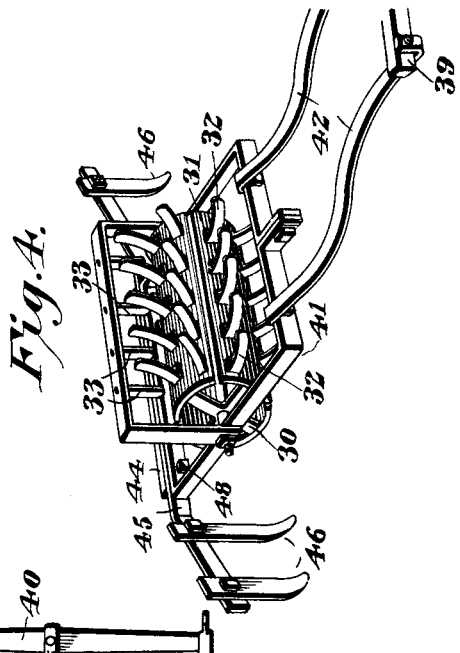
Fig. 4.
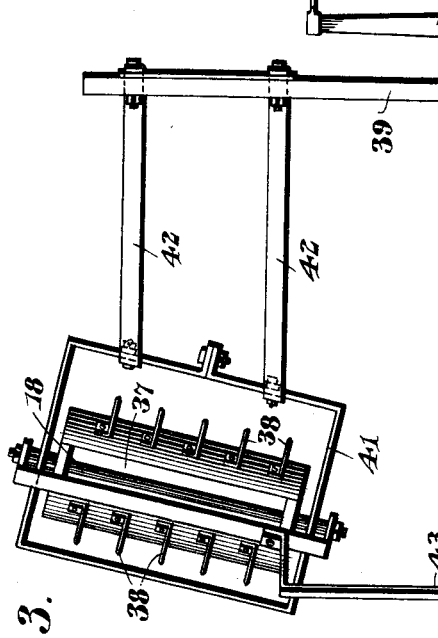
Fig. 3.
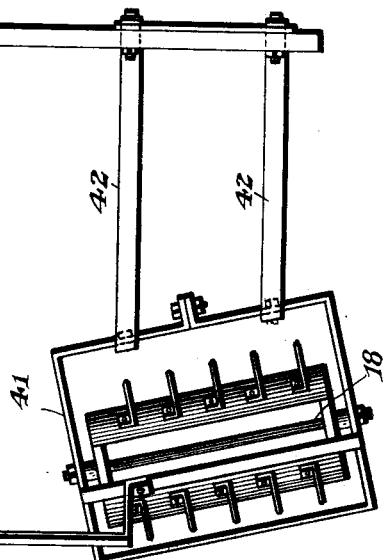
J.E.B. Ogden, Inventor

UNITED STATES PATENT OFFICE.

JOHN EMMET BROWNING OGDEN, OF BURTONS CREEK, VIRGINIA.

COMBINED COTTON CHOPPER AND CULTIVATOR.

SPECIFICATION forming part of Letters Patent No. 675,968, dated June 11, 1901.

Application filed December 27, 1900. Serial No. 41,256. (No model.)

*To all whom it may concern:*

Be it known that I, JOHN EMMET BROWNING OGDEN, a citizen of the United States, residing at Burtons Creek, in the county of Campbell and State of Virginia, have invented a new and useful Combined Cotton Chopper and Cultivator, of which the following is a specification.

This invention relates to a combined cotton chopper and cultivator, the object of the invention being to provide a machine adapted either as a walking or riding implement and which may be with little difficulty and in a short space of time converted from a cultivator into a chopper, or vice versa, and which will effectively chop or thin the cotton or thoroughly work and cultivate the soil contiguous to the plants and with the aid of a lister attachment bank up the soil on opposite sides of the plants while at the same time breaking or cutting and destroying weeds and undergrowth which would otherwise cause deterioration of the cotton-plants.

The invention contemplates the use of a series of interchangeable chopper-frames and cultivator-frames and the employment in connection therewith of means within reach of the driver whereby he is enabled to quickly raise and lower all of the frames simultaneously for gaging the depth of penetration, &c., or for throwing the machine as a whole into and out of operation whenever necessary.

The detailed objects and advantages of the invention will appear more fully in the course of the ensuing description.

The invention consists in a combined cotton chopper and cultivator embodying certain novel features and details of construction and arrangement of parts, as hereinafter fully described, illustrated in the drawings, and incorporated in the claims.

Figure 2:
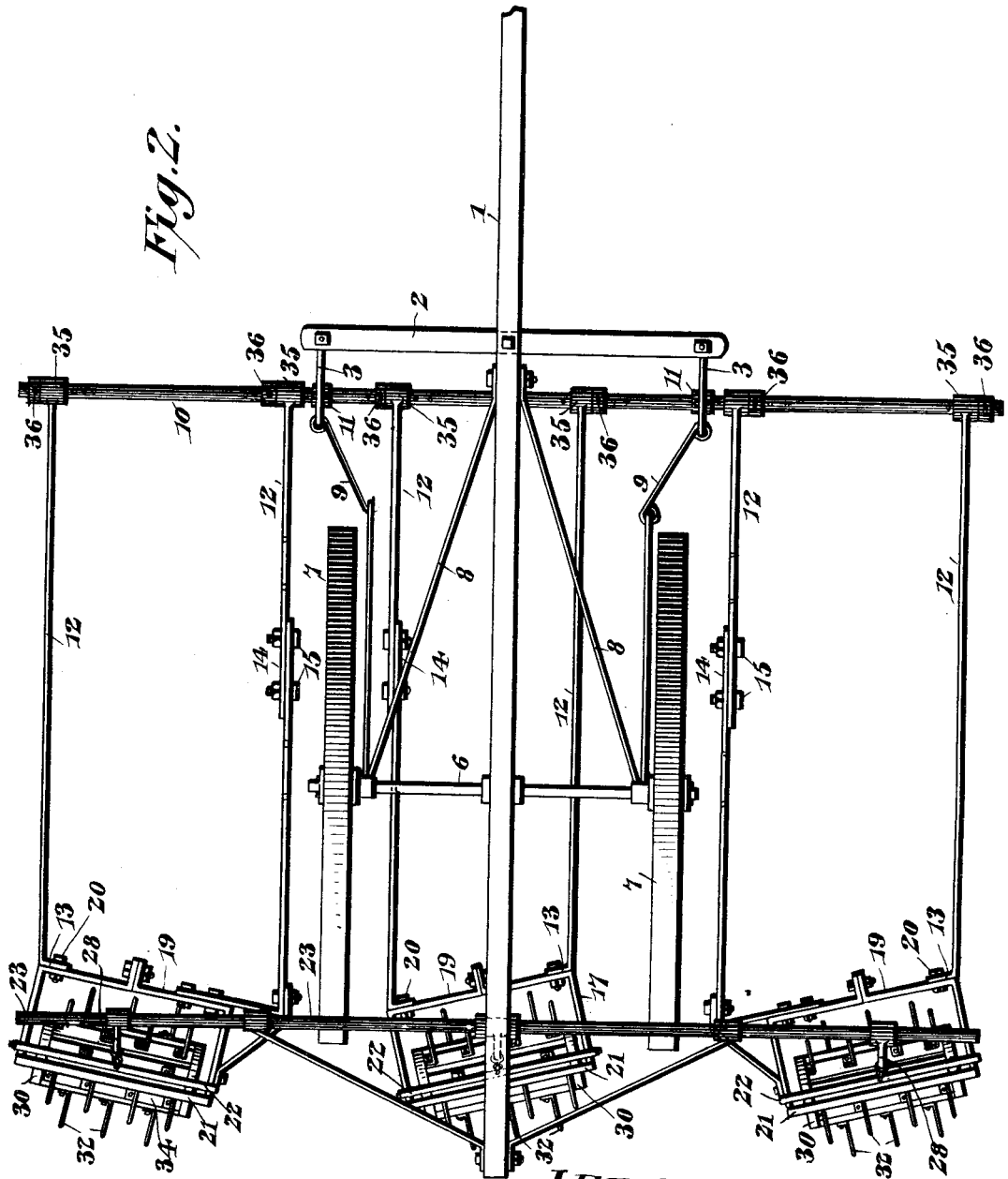

In the accompanying drawings, Figure 1 is a perspective view of a machine constructed in accordance with the present invention, shown adapted for use as a cultivator. Fig. 2 is a plan view of the same. Fig. 3 is a plan view of the walking implement adapted for use as a cotton-chopper. Fig. 4 is a detail perspective view of one of the cultivators and the frame in which the same is mounted, said view also showing a lister attachment applied to the cultivator-frame. Fig. 5 is a detail perspective view of the lister attachment.

Similar numerals of reference designate like parts in the several figures of the drawings.

The machine as adapted for cultivating cotton-plants in rows is best illustrated in the perspective view Fig. 1, wherein 1 designates the tongue or draft-pole of the machine, to which the draft-animals are hitched, and 2 a cross-bar, to the ends of which clevis-bars 3 are connected, each of said bars being provided with a longitudinal row of holes 4, thus making provision for the attachment of the whiffletree 5. The pole 1 has connected thereto an arched axle 6, on the ends of which are mounted carrying-wheels 7, said axle being braced relatively to the tongue by means of connections 8 and braced relatively to the clevis-bars by means of additional connections 9. All the parts hereinbefore referred to are of the ordinary construction and are not material to the present invention, excepting as they form an efficient support and carrying means for the improved devices.

In carrying out the present invention I provide a drag-bar 10, which extends transversely across the front of the machine and is mounted in bearings 11, connected to the clevis-bars 3 or other convenient part of the machine-frame. The wheels 7 are spaced apart, so as to travel between the rows and on opposite sides of a single row of cotton-plants. Mounted upon the drag-bar 10 is a series of drag-frames, each one of which comprises substantially parallel draft-bars 12, having their rear ends bent at an angle to form lateral extensions 13, to which the cultivator or chopper frame may be secured. One of these drag-frames is arranged between the carrying-wheels 7, while two other drag-frames are employed, arranged, respectively, at opposite sides of the machine or upon the outside of the carrying-wheels, as clearly illustrated in Fig. 1, thus enabling three rows of plants to be simultaneously cultivated or thinned.

By reference to Fig. 2 it will be seen that the cultivators are set obliquely or at an angle with respect to the line of draft of the machine. In order to accomplish this and enable the obliquity of the chopper and cultivator frames to be accurately regulated, one of the draft-bars of each frame is composed of two sections overlapping each other, as shown at 14, and secured together by means of removable pins or bolts 15, each of the draft-bar sections being provided with additional holes 16 for allowing the amount of overlap to be increased or diminished, correspondingly increasing or diminishing the length of the sectional draft-bar and setting the adjacent end of the chopper or cultivator frame forward or back, as the case may be.

Each of the cultivator-frames employed in connection with the draft-bars 12 comprises a pair of angular side bars 17, in which is received the axle 18, upon which the cultivating-cylinder is journaled. The forward ends of the side bars 17 are connected by a cross-bar 19, to which the extensions 13 of the draft-bars are removably connected by the detachable bolts 20. The upper ends of the upright portions of said bars 17 are also connected by means of a cross-bar 21, above which is arranged a bail or lifting-bar 22, connected indirectly to the rock-shaft 23, extending transversely of the machine. The rock-shaft is operated by means of a hand-lever 24 within reach of the driver in his seat 25 on the machine and is equipped with a thumb latch-lever 26, operating a latch adapted to engage with the segmental rack 27 on the frame for holding the rock-shaft at any adjustment. The rock-shaft is provided at points above the cultivator-frames with crank-arms 28, to which are connected chains or other flexible connections 29, which extend downward and connect directly with the bails 22. The driver by rocking the operating-lever 24 and turning the rock-shaft 23 is enabled to simultaneously elevate or lower the cultivator-frames, and thus regulate the depth of penetration of the cultivator-teeth or lift the cultivator entirely clear of the ground in traveling to and from the place of operation.

Each cultivator is of a cylindrical form and comprises circular end pieces or spiders 30, connected by means of plates 31 in the form of segments of a hollow cylinder, said plates being secured to the cylinder end and being provided with a plurality of cultivating-teeth 32, preferably secured in staggered relation to each other upon their respective segments. Instead of making the teeth 32 perfectly straight from end to end they are curved or struck on the arcs of circles longitudinally, so that by reason of their shape, taken in connection with the oblique line of travel of the machine itself, they will have a lifting effect on the soil and serve to twist and tear up roots and other undergrowth which would interfere with the growth of the cotton-plants. While it is ordinarily preferred to form these teeth on curves, as shown in Fig. 4, they may of course be made straight from end to end, as shown, for example, in Fig. 2.

33 designates a series of cleaning-teeth connected to one of the cross-bars of the cultivator-frame and arranged to lie close to the cultivator-teeth for the purpose of removing clods of earth, weeds, &c., therefrom. Instead of forming the cultivating-cylinders of segmental plates in the manner above described the teeth 33 may be secured to parallel bars or flights 34, arranged equidistantly and connected at their extremities to the cylinder ends, as shown in Figs. 1 and 2.

In order to adjust the cultivating-cylinders so as to operate properly upon their respective rows of cotton-plants, the draft-bars 12 are provided at their forward ends with sleeves 35, which surround the drag-bar 10 and are provided with pins or other suitable fastening devices 36, adapted to be received in openings in the drag-bar. By removing the said pins or fasteners the draft-bars may be moved toward one side or the other of the machine, and when properly adjusted to the width of the rows they may be secured in such position by reinserting the pins or fasteners 36.

By reference to Figs. 1 and 2 it is seen that the outside cultivator-cylinders are arranged at reverse angles to each other. The object of this arrangement is to equalize as far as possible the side draft on the machine caused by setting the cultivator-cylinders at an angle with respect to the line of draft, and, as previously stated, the angles of the several cultivating-cylinders may be adjusted by means of the sectional and overlapping draft-bars.

The chopping-cylinders are very similar in construction to the cultivating-cylinders, and in constructing said cylinders preference is given to the form shown in Fig. 4, wherein the periphery of the cylinder is made up of curved metal sections conforming in curvature to the circumference of the cylinder. The chopping-cylinder, however, differs in construction from the cultivating-cylinder in that spaces 37 are left between the adjoining plates, so that such unobstructed portions of the surface of the cylinder will pass over the young and tender cotton-plants without injuring the same, while intervening plants will be chopped and thinned out by the cutting-teeth 38, which are secured to the cylinder sections, a illustrated in Fig. 3.

In Fig. 3 the chopping-cylinders are shown as used in connection with a walking implement, the frame of which comprises a front drag-bar 39, to which the draft attachment 40 is connected. The chopper-frames 41 are similar in construction to the cultivator-frames hereinabove described and are connected to the drag-bar by means of draft-bars 42. The upper portions of the chopper-frames are connected by a yoke or bail 43, which forms an efficient lifting-handle for enabling the operator walking in rear of the machine to lift the chopping-cylinders bodily and move the machine from side to side, as occasion arises. It will also be noted in Fig. 3 that the chopping-cylinders are set at reverse angles to each other for the purpose of equalizing side draft on the machine.

In connection with the machine it is sometimes desirable to use a lister, which I have illustrated in the form of an attachment in Figs. 4 and 5, Fig. 4 illustrating the manner of attaching the lister to the cultivator-frame, and Fig. 5 illustrating in detail the construction of the lister. The lister attachment comprises a main bar 44 and auxiliary bars or end extension-pieces 45, each of which carries a plurality of teeth or shovels 46, having forwardly - deflected lower ends, which have a tendency to lift the soil and bank the same on either side of the row of plants. The end portions of the extension-bars 45 are deflected at corresponding angles to each other, so that the terminal portion of one bar extends forward, while the corresponding portion of the other bar projects rearwardly. The main bar 44 of the lister attachment is provided with a number of holes 47 to receive bolts or other fasteners 48, adapted to pass through the extension-bars 45, thus enabling the lister attachment to be extended or contracted longitudinally, according to conditions and requirements. The lister attachment is preferably secured to the rearward extension of the cultivator-frame, so that the shovels 46 will project beyond the opposite sides of said frame and operate between the rows of plants.

From the foregoing description it will be seen that I have provided a combined cotton chopper and cultivator of exceedingly light draft on account of the absence of gearing or other mechanism for revolving the chopping or cultivating teeth. This enables the machine to be drawn readily and easily over the field and requires fewer draft-animals. As the machine is drawn along the rows of cotton when the cotton-choppers are in use stalks of cotton are left untouched at intervals along the rows, while intervening stalks and plants are chopped out and all weeds and undergrowth at the same time cut and twisted out of the soil. The teeth also operate to break up any large clods of earth, which are injurious to young and tender cotton-plants. By setting the cylinders at an angle with respect to the line of draft a dragging action is imparted thereto, as well as a revolving motion, and the angle at which the teeth on the cylinders set causes them to twist into and out of the soil, thereby turning and tearing up roots and young cotton-plants. The machine is simple and cheap in construction and is adapted for use either as a riding or walking implement. In a riding-cultivator the draft-animals are hitched to the frame so as to travel between the rows. It will also be observed that the cultivator-teeth are preferably made longer than the chopper-teeth, so as to effectually agitate and turn the soil.

From the foregoing it is thought that the construction, operation, and many advantages of the herein-described combined cotton chopper and cultivator will be readily apparent to those skilled in the art without further description, and it will be understood that various changes in the form, proportion, and minor details of description may be resorted to without departing from the principle or sacrificing any of the advantages of this invention.

Having thus described the invention, what is claimed as new, and desired to be secured by Letters Patent, is—

1. A cotton-cultivating implement comprising a plurality of yieldably-supported toothed cylinders having their axes of rotation at an angle to each other, substantially as described.

2. A cotton-cultivating implement comprising a plurality of yieldably-supported toothed cylinders set obliquely to the line of draft of the machine, and at reverse angles to each other, substantially as described.

3. A cotton-cultivating implement comprising a plurality of yieldably-supported toothed cylinders set obliquely to the line of draft, and means for changing the angle of obliquity of the cylinders, substantially as described.

4. A cotton-cultivating implement comprising a plurality of toothed cylinders set obliquely to the line of draft, and longitudinally-extensible draft-bars connecting the said cylinders with the machine-frame, for the purpose specified.

5. A cotton-cultivating implement comprising a toothed cylinder set obliquely to the line of draft, and a pair of draft-bars connecting said cylinder with the machine-frame, one of the draft-bars being longitudinally extensible, substantially as and for the purpose specified.

6. A cotton-cultivating implement comprising a plurality of toothed cylinders set obliquely to the line of draft, and a pair of draft-bars connecting each cylinder with the machine-frame, one of said draft-bars comprising sectional and overlapping portions, substantially as described.

7. A cotton-cultivating implement comprising a plurality of toothed cylinders, a drag-bar extending transversely of the machine, and draft-bars for the cylinders adjustable longitudinally of the drag-bar, substantially as described.

8. A cotton-cultivating implement comprising a plurality of toothed cylinders, a drag-bar extending transversely of the machine, and provided with longitudinal series of holes, and draft-bars for the cylinders adjustable longitudinally of the drag-bar and provided with adjustable fasteners for engaging the drag-bar, substantially as described.

9. A cotton-cultivating implement comprising a plurality of toothed cylinders, a drag-bar extending transversely of the machine, draft-bars for the cylinders connected to the drag-bar, and means for simultaneously raising and lowering the cylinders, substantially as described.

10. A cotton-cultivating implement comprising a plurality of toothed cylinders, a drag-bar extending transversely of the machine, draft-bars connecting the cylinders with the drag-bar, a rock-shaft and operating mechanism therefor, and means between the rock-shaft and cylinder-frames for raising and lowering the cylinders, substantially as described.

In testimony that I claim the foregoing as my own I have hereto affixed my signature in the presence of two witnesses.

JOHN EMMET BROWNING OGDEN.

Witnesses:
 H. F. SHIRE,
 J. H. LINKOW.